United States Patent [19]

Beugin

[11] Patent Number: 4,757,725

[45] Date of Patent: Jul. 19, 1988

[54] GUIDE SYSTEM COMPRISING A GEAR RACK, APPARATUS COMPRISING SUCH A SYSTEM, AND ELEMENT FOR SUCH A SYSTEM

[75] Inventor: Michel P. Beugin, Flers, France

[73] Assignee: U.S. Philips Corporation, New York, N.Y.

[21] Appl. No.: 884,801

[22] Filed: Jul. 11, 1986

[30] Foreign Application Priority Data

Jul. 16, 1985 [FR] France ............................. 85 10858

[51] Int. Cl.$^4$ .......................... F16H 1/04; F16H 19/04
[52] U.S. Cl. ...................................... 74/422; 74/89.17; 74/89.2
[58] Field of Search ................ 74/422, 89.17, 109; 360/85, 95, 96.5; 248/424, 429, 430

[56] References Cited

U.S. PATENT DOCUMENTS

| | | | |
|---|---|---|---|
| 2,446,423 | 8/1948 | Kilchenmann | 74/52 |
| 2,780,112 | 2/1957 | Young | 74/422 |
| 3,313,512 | 4/1967 | Colautti et al. | 248/424 |
| 3,896,682 | 7/1975 | Kreidler | 74/606 R |
| 3,901,162 | 8/1975 | Bertin | 74/422 |
| 4,015,292 | 3/1977 | Kirn | 360/85 |
| 4,379,314 | 4/1983 | Kamimura et al. | 360/96.5 |
| 4,434,444 | 2/1984 | Sato | 360/96.5 |
| 4,546,396 | 10/1985 | Schatteman | 360/96.5 |
| 4,583,138 | 4/1986 | Imazaike | 360/96.5 |

FOREIGN PATENT DOCUMENTS

| | | | |
|---|---|---|---|
| 58-163856 | 9/1983 | Japan | 74/50 |
| 2112994 | 7/1983 | United Kingdom . | |

*Primary Examiner*—Lawrence Staab
*Attorney, Agent, or Firm*—F. Brice Faller

[57] ABSTRACT

An apparatus for guiding the linear movement of one assembly relative to another assembly. One of the two assemblies has a pair of gear racks disposed parallel to the direction of movement. The other of the assemblies has at least two gear elements which mesh with the respective gear racks. The movement of the gear elements is synchronized in such a way that the gear elements each perform identical displacements along the associated gear rack. This prevents jamming of the assemblies during the linear movement. Several ways of synchronizing the gear elements are disclosed.

3 Claims, 2 Drawing Sheets

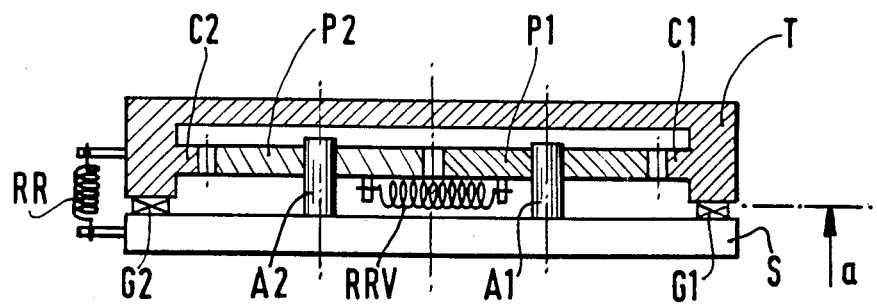
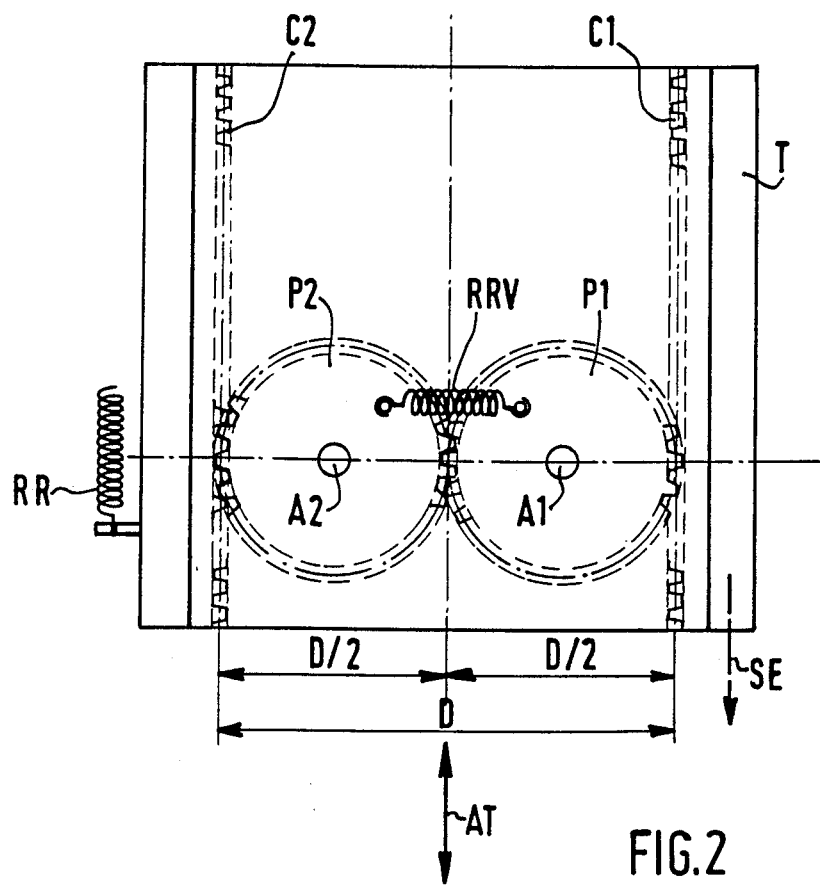

GUIDE SYSTEM COMPRISING A GEAR RACK, APPARATUS COMPRISING SUCH A SYSTEM, AND ELEMENT FOR SUCH A SYSTEM

BACKGROUND OF THE INVENTION

The invention relates to a guide system comprising a gear rack for guiding the movement of two assemblies, of which one assembly is movable relative to the other in backward and foward linear movement.

British Patent Application No. GB 2,112,994 A describes such a rack system.

Such a system is frequently used for guiding a drawer in video or audio equipment: when the drawer is open the disc or cassette can be changed and when the drawer is closed the apparatus is in the operating position.

Such a known system comprises two racks and two pinions, the two pinions being mounted on the same horizontal spindle; such a system is likely to give rise to jamming because the pinions may be loaded by the drawer and at the same be subjected to an asymmetrical force, resulting in a stronger jamming or interference effect and increased wear of the teeth.

SUMMARY OF THE INVENTION

One of the two assemblies comprises two gear racks disposed in the same plane and parallel to the movement. The other assembly comprises at least two gear elements which each mesh with a respective rack, the axis of rotation of each gear element extending perpendicularly to the plane of the racks. The movements of each gear element are synchronized in such a way that the gear elements each perform identical displacements along the associated gear racks.

Thus, if the system is loaded eccentrically in order to move one of the two movable elements, for example if a load is exerted along the axis of one of the two racks, the loaded rack will drive the gear element with which it is in mesh and this element will synchronously drive the other gear element which as it bears on the other gear rack responds in such a way that the guide system does not jam despite the eccentric load.

A guide system in accordance with the invention is particularly advantageous if synchronising means having two pinions of equal diameter which mesh with each other and each mesh with the associated gear rack are used.

Such a guide system is a simple and cheap construction.

BRIEF DESCRIPTION OF THE DRAWINGS

FIG. 1 is an end section view.

FIG. 2 is a bottom view;

DETAILED DESCRIPTION OF THE PREFERRED EMBODIMENTS

Figure 3:
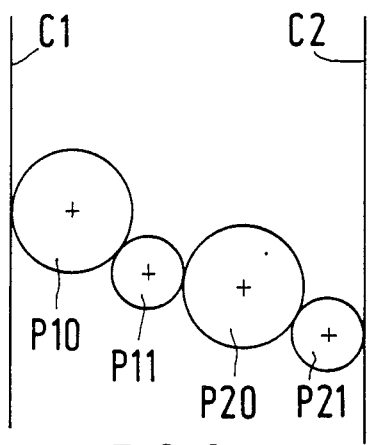
FIGS. 3, 4, 5 and 6 are plan views which schematically show various examples of the synchronizing means.

FIGS. 1 and 2 show a movable element or drawer T with two gear racks C1 and C2 facing each other in the same plane; the two pinions P1 and P2 are rotatable about spindles A1 and A2, the axes of rotation extending perpendicularly to the plane in which the gear racks are situated.

FIG. 2 shows that the gear racks are situated at a distance D from each other, the pinions having a diameter of D/2.

In FIG. 2 the forward and backward movement of the drawer is indicated by the arrow AT, which is shown in line with the central axis of the drawer. If a load is exerted along the drawer axis, the system of forces is symmetrical and each gear rack cooperates with a pinion in such a way that the two pinions are rotated in mutually opposite directions. Since the pinions mesh with each other along the axis AT, the two gear racks necessarily move with the same speed, and jamming is not possible. The same situation in which the elements drive each other and there is no jamming is obtained if the drawer is subjected to an eccentric load, for example, a force SE.

FIG. 1 clearly shows that the weight of the drawer (T) does not bear on the teeth but on the base (S) at the locations G1 and G2; a satisfactory sliding movement can be obtained if the contact surfaces at G1 and G2 are smooth surfaces but in certain cases it is possible to employ ball-guides or other means in order to reduce friction.

In order to limit the travel of the drawer in such a way that the system cannot become disengaged, there may be provided stops, known per se, at the end of the travel.

In order to ensure that the drawer always resumes the same position there may be provided a return spring (RR) of which one end is attached to the base and of which the other end is attached to the drawer; as shown in FIGS. 1 and 2 the spring (RR) is situated off-axis but this has no adverse effect for the same reasons as explained above for the off-axis load SE.

Alternatively, a return coil spring (RRV) may be arranged directly between the two pinions, as shown in FIG. 2. When the drawer is loaded in the direction indicated by the arrow SE, the points of attachment at opposite ends of the spring (RRV) tend to move away from one another because of the mutually opposite rotation of the pinions. This arrangement is suitable only if the pinions rotate only through a limited angle for example not more than $\frac{1}{4}$ or $\frac{1}{2}$ turn, for the linear travel of the drawer.

A torsion spring, not shown, which acts on one of the pinions is also suitable for this purpose.

In certain cases the spring action of the return spring may be too abrupt, so that it is advantageous to provide the system with damping means for damping the movement produced by the return spring. Various damping means are known to those skilled in the art, for example damping grease as used for damping the movement of a pivoting cassette holder in a magneto cassette recorder.

If D is large, it is advantageous to form openings (not shown) in the side faces of the pinions to reduce their mass.

The spindle of each pinion may be supported by the base or may be integrally with the base. Integral molding is not possible with the arrangement employed in the afore-mentioned British Patent Application.

The system in accordance with the invention is particularly suitable for an automatically motor-controlled drawer movement because the motor can drive a drive pinion, not shown, which meshes with one of the two above-mentioned pinions.

It is to be noted that in the foregoing the concept of a base and drawer is entirely subjective. When FIG. 1 is viewed upside down the base becomes the drawer and the drawer becomes the base; the gear racks are then mounted in the base, and the pinions form part of the drawer, resulting in an equivalent system; the base and the drawer may be sold separately.

In certain cases it may be interesting to increase the number of pinions; by varying the diameters of the pinions it is even possible to obtain different travels and speeds for the movements of a set of drawers.

In FIG. 2, which shows a preferred embodiment, the straight line which interconnects the centres of the pinions extends perpendicularly to the gear racks but this is not necessarily so.

FIG. 3 shows schematically a modification with a nonperpendicular arrangement; a modification of this kind, in which the synchronising means comprise a gear system, is suitable if only a limited space is available; in FIG. 3 this gear system comprises four pinions and the gear racks face one another; the pinions P10 and P20 have the same diameter and the pinions P11 and P21 have the same diameter.

Figure 4:
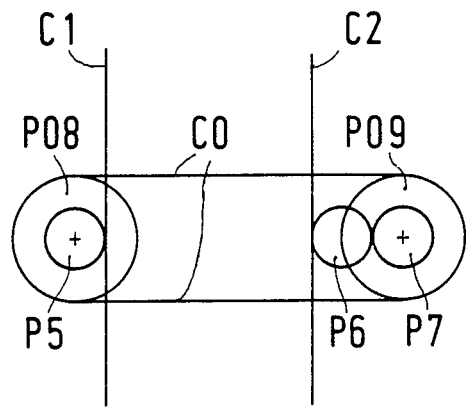

In FIG. 4 the gear racks C1, C2 are arranged back to back and the synchronising system comprises a toothed belt CO. In the embodiment shown in FIG. 4 there are 3 pinions P5, P6, P7 and two pulleys PO8, PO9.

Figure 5:
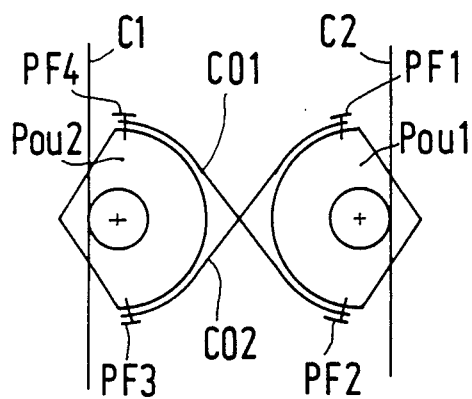

In FIG. 5 the sychronising system comprises two belt elements CO1 and CO2 which limit the travel. Pulleys POU1 and POU2 have the shape of sectors of circle and are not completely circular; this arrangement is suitable if only a limited space is available. Belt elements CO1, CO2 are of the piano-string or other type attached by known fixing means PF1, PF2, PF3, PF4.

Figure 6:
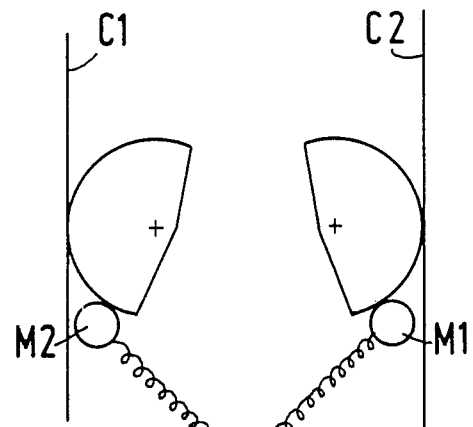

FIG. 6 shows an embodiment using incomplete pinions; this embodiment is suitable for a comparatively small travel; the synchronising means comprise, for example, two motors M1, M2 synchronised by known synchronising means SY.

A multitude of modifications are possible to those skilled in the art without departing from the scope of the invention, for example employing the basic idea that constantly meshing elements such as racks, gears, toothed belts, etc., couple one side of the drawer to the other side such that equal displacements result on both sides.

What is claimed is:

1. A video or audio apparatus comprising
   a substantially horizontal base,
   a drawer movable linearly relative to said base from a rest position to a displaced position,
   bearing means between said base and said drawer to facilitate sliding movement therebetween,
   two gear racks fixed to said drawer, said racks being disposed in a substantially horizontal plane parallel to said movement,
   two pinion gears, each having an axis of rotation fixed relative to said base and perpendicular to the plane of said racks, each gear being in mesh with a respective rack, said two pinion gears being meshed with each other as well as with respective racks,
   a single coil spring for urging said drawer toward said rest rest position, said spring having opposite ends which are attached to respective pinion gears.

2. Apparatus as in claim 1 further comprising two spindles supported by said base, each spindle corresponding to a respective axis of rotation, said pinion gears being mounted on said spindles.

3. Apparatus as in claim 2 wherein said spindles are molded integrally with said base.